(12) United States Patent  
Moshayedi

(10) Patent No.: US 8,275,981 B2
(45) Date of Patent: Sep. 25, 2012

(54) FLASH STORAGE SYSTEM AND METHOD FOR ACCESSING A BOOT PROGRAM

(75) Inventor: Mark Moshayedi, Newport Coast, CA (US)

(73) Assignee: STEC, Inc., Santa, Ana, CA (US)

( * ) Notice: Subject to any disclaimer, the term of this patent is extended or adjusted under 35 U.S.C. 154(b) by 494 days.

(21) Appl. No.: 12/508,528

(22) Filed: Jul. 23, 2009

(65) Prior Publication Data

US 2011/0022829 A1 Jan. 27, 2011

(51) Int. Cl.
G06F 12/00 (2006.01)

(52) U.S. Cl. ............... 713/1; 713/2; 711/100; 711/103; 711/209

(58) Field of Classification Search ............ 713/1, 2; 711/100, 103, 209
See application file for complete search history.

(56) References Cited

U.S. PATENT DOCUMENTS

| | | | |
|---|---|---|---|
| 6,418,506 B1 * | 7/2002 | Pashley et al. | 711/103 |
| 2004/0143696 A1 * | 7/2004 | Hsieh | 711/5 |
| 2007/0300010 A1 * | 12/2007 | Yang et al. | 711/103 |

* cited by examiner

*Primary Examiner* — M Elamin
(74) *Attorney, Agent, or Firm* — McDermott Will & Emery LLP

(57) ABSTRACT

A computing system includes a flash storage device that loads a boot program from a flash storage of the flash storage device to a random access memory of the flash storage device. A processor of the computing system then accesses the boot program from the random access memory and executes the boot program.

20 Claims, 2 Drawing Sheets

FLASH STORAGE SYSTEM AND METHOD FOR ACCESSING A BOOT PROGRAM

BACKGROUND

1. Field of Invention

The present invention generally relates to flash storage, and more particularly to a flash storage system and method for accessing a boot program of a computing system.

2. Description of Related Art

A typical computing system executes a boot program upon the occurrence of a system reset to initialize various devices in the computing system, such as hard drives, floppy drives, and compact disc (CD) drives. Such a boot program is sometimes referred to as a basis input/output system (BIOS). In addition to initializing the various devices in the computing system, the boot program may also perform diagnostic self-tests on the devices to determine whether the devices are operating properly. The computing system then loads one or more software programs, such as an operating system, from the storage devices into a main memory of the computing system and executes the software programs to control operation of the computing system.

In many computing systems, the boot program is stored in a nonvolatile memory, such as a read-only-memory (ROM), an erasable read-only-memory (EPROM), or an electrically erasable read-only-memory (EEPROM). Because the memory access time of the non-volatile is relatively slow, some computing system load the boot program from the nonvolatile memory into a main memory having a faster memory access time. The computing system then executes the boot program from the main memory. Loading the boot program from the nonvolatile memory into the main memory, however, consumes processing time and resources in the computing system. Moreover, the boot program consumes memory locations in the main memory, which would otherwise be available for software programs.

In light of the above, a need exists for an improved system and method for accessing a boot program.

SUMMARY

In various embodiments, a flash storage device includes a flash storage, a random access memory, and a flash controller. The flash controller loads a boot program of a computing system from the flash storage into the random access memory. A processor of the computing system then accesses the boot program from the random access memory. Because the memory access time of the random access memory is faster than that of the flash storage, the processor accesses the boot program from the random access memory more quickly than would occur if the processor accessed the boot program from the flash storage.

In a further embodiment, the flash storage device loads the boot program from the random access memory of the flash storage system into a data memory of the computing system. The processor then accesses the boot program from the data memory. Because the memory access time of the random access memory is faster than that of the flash storage, the boot program is loaded from the random access memory into the data memory of the computing system more quickly than would occur if the boot program was loaded into the data memory from the flash storage.

A flash storage system for accessing a boot program, in accordance with one embodiment, includes a flash storage, a random access memory, and a flash controller coupled to the flash storage and the random access memory. The flash controller is configured to load a boot program from the flash storage into the random access memory.

A computing system, in accordance with one embodiment, includes a processor, a data memory coupled to the processor, and a flash storage device coupled to the processor. The flash storage device includes a flash storage, a random access memory, and a flash controller coupled to the flash storage and the random access memory. The flash controller is configured to load a boot program from the flash storage into the random access memory.

A method, in accordance with one embodiment, accesses a boot program in a computing system including a flash storage device. The method includes receiving a start signal and loading the boot program from a flash storage of the flash storage device to a random access memory of the flash storage device based on the start signal. The method further includes generating a ready signal indicating the boot program is accessible in the random access memory.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings.

DESCRIPTION

In various embodiments, a flash storage device stores a boot program in flash storage and loads the boot program into a random access memory of the flash storage device based on a start signal. Additionally, the flash storage device generates a ready signal indicating the boot program is accessible from the random access memory.

Figure 1:
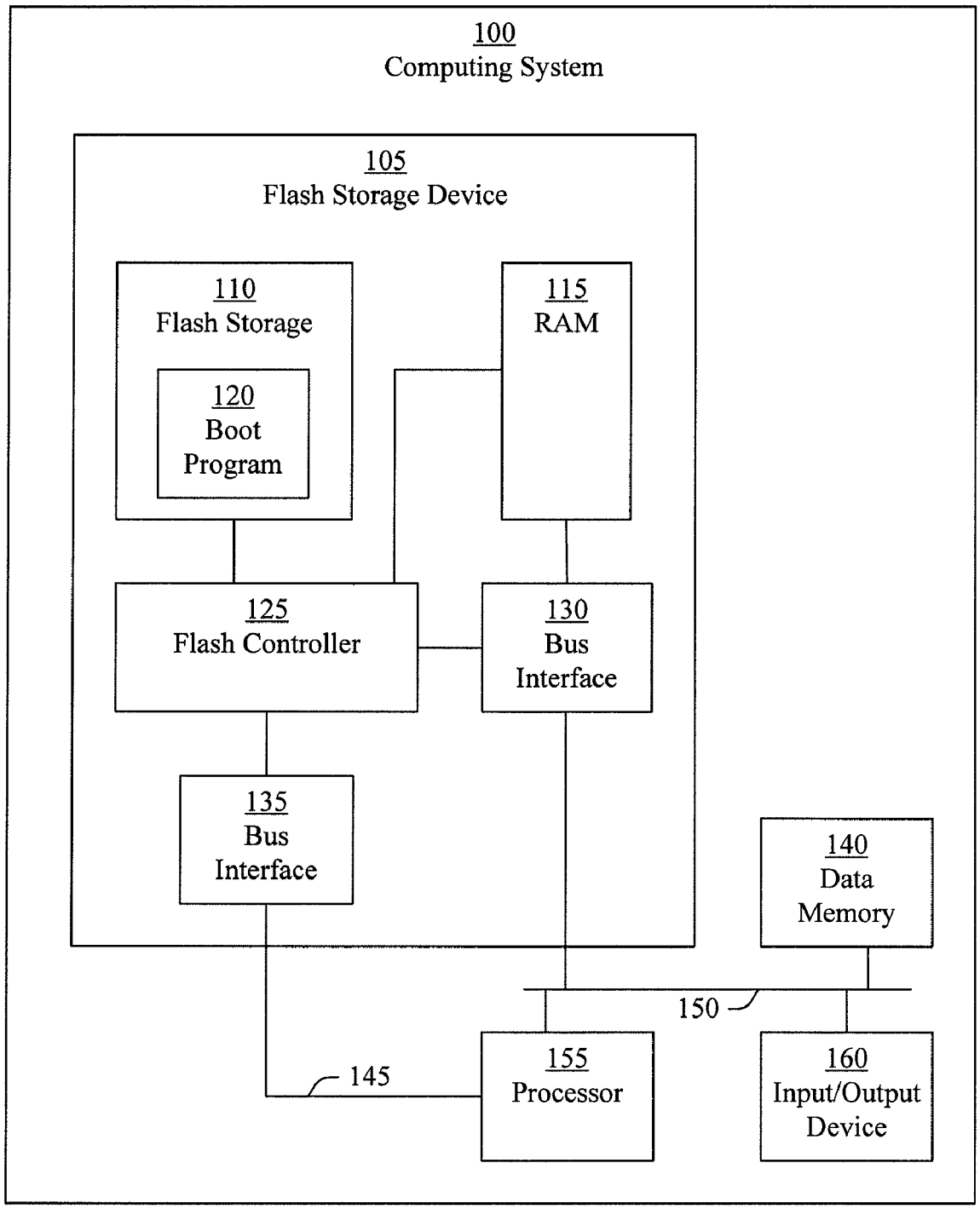
FIG. 1 is a block diagram of a computing system including a flash storage device, in accordance with an embodiment of the present invention.

FIG. 1 illustrates a computing system 100, in accordance with an embodiment of the present invention. The computing system 100 may be any computing or electronic device, such as a computer workstation, an embedded computing system, a network router, a portable computer, a personal digital assistant, a digital camera, a digital phone, or the like. The computing system 100 includes a flash storage device 105, a data memory 140, a communication bus 145, a system bus 150, a processor 155, and an input/output device 160. The flash storage device 105 and the processor 155 are coupled in communication with each other through the communication bus 145. Additionally, the flash storage device 105, the data memory 140, the processor 155, and the input/output device 160 are coupled in communication with each other through the system bus 150.

The data memory 140 may include be any memory, computing device, or system capable of storing data. For example, the data memory 140 may be a random access memory (RAM), a dynamic random access memory (DRAM), a static random access memory (SRAM), a synchronous dynamic random access memory (SDRAM), a flash storage, an erasable programmable read-only-memory (EPROM), an electrically erasable programmable read-only-memory (EEPROM), or the like. The processor 155 may include a microprocessor, a microcontroller, an embedded controller, a logic circuit, software, firmware, or any kind of processing device. The input/output device 160 may include any system or device for communicating data with the computing system 100. For example, the input/output device 160 may include a keyboard, a computer mouse, a video display, a hard drive, a floppy drive, a compact disc (CD) drive, a read only memory (CD-ROM) drive, a digital versatile disc (DVD) drive, or the like, or any combination thereof.

The flash storage device 105 includes a flash storage 110, a random access memory (RAM) 115, a flash controller 125, a bus interface 130, and a bus interface 135. The flash storage 110 and the random access memory 115 are coupled in communication with the flash controller 125. The bus interface 130 is coupled in communication with the random access memory 115, the flash controller 125, and the system bus 150. The bus interface 135 is coupled in communication with the flash controller 125 and the communication bus 145. In some embodiments, the bus interface 130 is optional. In these embodiments, the processor 115 is coupled to the random access memory 115 and the flash controller 125. In some embodiments, the bus interface 135 is optional. In one embodiment without the bus interface 135, the processor 135 is coupled to the flash controller 125. In another embodiment without the bus interface 135, the processor 155 communicates with the flash controller 125 through the bus interface 130. In other embodiments, the bus interface 130 or the bus interface 135, or both, are external of the flash storage device 105.

The flash storage 110 may be any type of flash storage, such as a flash storage system, a flash storage device, a flash storage array, or the like. The flash controller 125 may include a microprocessor, a microcontroller, an embedded controller, a logic circuit, software, firmware, or any kind of processing device. The random access memory 115 may be any type of memory, such as a dynamic random access memory (DRAM), a static random access memory (SRAM), a synchronous dynamic random access memory (SDRAM), or the like. In some embodiments, the random access memory 115 is a dual-port memory. The bus interface 130 may be any type of computer or communication interface, such as integrated drive electronics (IDE) interface. The bus interface 135 may be any type of computer or communication interface, such as a universal serial bus (UBS) interface, a serial peripheral interface (SPI), a multimedia card (MMC) interface, or a solid-state drive (SD) interface. In some embodiments, the flash storage device 105 has more than one flash storage 110. In some embodiments, the flash storage device 105 has more than one random access memory 115.

The flash storage device 105 also contains a boot program 120 for initializing the computing system 100. The boot program 120 may be a basic input output system (BIOS), an application level program, an operating system, or the like. As illustrated in FIG. 1, the flash storage 110 contains the boot program 120. In various embodiments, the flash controller 125 loads the boot program 120 from the flash storage 110 into the random access memory 115. In some embodiments, the flash controller 125 is directly coupled to both the flash storage 110 and the random access memory 115 and directly controls the flash storage 110 and the random access memory 115 without intervening components, such as an arbiter or a communication interface. In this way, the flash controller 125 transfers the boot program 120 from the flash storage device 105 to the random access memory 115 more quickly than a system that requires an arbiter or a separate communication interface for such a transfer. In some embodiments, the flash controller 125 performs a direct memory access to transfer the boot program 120 from the flash storage 110 to the random access memory 115.

The processor 155 accesses the boot program 120 from the random access memory 115 and executes the boot program 120. Because the memory access time of the random access memory 115 is generally faster than the random access time of the flash storage 110, the processor 155 accesses and executes the boot program 120 from the random access memory 115 more quickly than would occur in accessing and executing the boot program 120 from the flash storage 110. In this way, execution performance of the computing system 100 is improved.

In one embodiment, the flash controller 125 receives a start signal from the processor 155, and loads the boot program 120 from the flash storage 110 into the random access memory 115 in response to the start signal. For example, the start signal may be a hard system reset signal or a soft system reset signal of the computing system 100. In one embodiment, the flash controller 125 receives the start signal directly from the processor 155. In another embodiment, the flash controller 125 receives the start signal from the processor 155 through the bus interface 130. In still another embodiment, the flash controller 125 receives the start signal from the processor 155 through the bus interface 135. In other embodiments, the flash storage device 105 generates the start signal upon power-on of the flash storage device 105 or receives the start signal from a device external of the flash storage device 105 upon power-on of that device. In one embodiment, the device includes a capacitor that charges to a voltage level upon power-on of the computing system 100. In this embodiment, the device provides the start signal to the flash controller 125 when the voltage on the capacitor reaches a threshold voltage.

In a further embodiment, the flash controller 125 provides a ready signal to the processor 155 indicating the boot program 120 is accessible from the random access memory 115. In one embodiment, the flash controller 125 provides the ready signal directly to the processor 155. In another embodiment, the flash controller 125 provides the ready signal to the processor 155 through the bus interface 130. In still another embodiment, the flash controller 125 provides the ready signal to the processor 155 through the bus interface 135. In response to the ready signal received from the flash controller 125, the processor 155 accesses the boot program 120 from the random access memory 115 and executes the boot program 120.

In various embodiments, the flash controller 125 loads the boot program 120 from the random access memory 115 into the data memory 140 before providing the ready signal to the processor 155. In one embodiment, the flash controller 125 controls operation of the bus interface 130 to load the boot program 120 from the random access memory 115 through the bus interface 130 and the system bus 150 into the data memory 140. In this embodiment, the flash controller 125 provides control signals to the bus interface 130 for transferring the boot program 120 from the random access memory 115 to the data memory 140. In response to the control signals received from the flash controller 125, the bus interface 130 obtains access to the system bus 150 and transfers the boot program 120 from the random access memory 115 to the data memory 140.

In another embodiment, the flash controller 125 provides a control signal to the bus interface 130 for transferring the boot program 120 from the random access memory 115 to the data memory 140. In response to the control signal received from the flash controller 125, the bus interface 130 obtains access to the system bus 150 and performs a direct memory access to transfer the boot program 120 from the random access memory 115 to the data memory 140. Because the memory access time of the random access memory 115 is generally faster than the random access time of the flash storage 110, the bus interface 130 transfers the boot program 120 from the flash storage 110 to the data memory 140 more quickly than would occur in transferring the boot program 120 from the flash storage 110 to the data memory 140. In this way, execution performance of the computing system 100 is improved.

In some embodiments, the size of the boot program 120 is larger than the memory size of the random access memory 115. In this case, the flash controller 125 loads the boot program 120 into the data memory 140 by transferring a portion of the boot program 120 to the random access memory 115 and transferring the portion from the random access memory 115 to the data memory 140. The flash controller 125 repeats this process until the boot program 120 is contained in the data memory 140 and sends the ready signal to the processor 155 indicating the boot program 120 is accessible from the data memory 140.

In various embodiments, the flash storage device 105 includes an integrated circuit containing some or all of the components of the flash storage device 105. It is to be appreciated that including the components of the flash storage device 105 in an integrated circuit improves the performance of the flash storage device 105 in contrast to a flash storage device having discrete components because communication between the components of the flash storage device 105 is improved. For example, the flash controller 125 may more quickly transfer the boot program 120 from the flash storage 110 to the random access memory 115 because of higher data transfer rates in the integrated circuit. In one embodiment, the flash storage device 105 includes a package that is pin-compatible with a DOC-H3 flash storage device available from Hynix Semiconductor Inc. of Sunnyvale, Calif. In this embodiment, the flash storage device 105 includes the functionally of such a DOC-H3 flash storage device and may be used to replace the DOC-H3 flash storage device in various computing systems. In further embodiments, the flash storage device 105 includes additional functionality than that of the DOC-H3 flash storage device, as is describe more fully herein.

In one embodiment, the processor 155 controls programming of the flash storage device 105. In this embodiment, the processor 155 communicates with the flash controller 125 to store or modify the boot program 120 in the flash storage 110. In another embodiment, an external device, such as a programmer, may be coupled to the bus interface 135 for storing or modifying the boot program 120 in the flash storage 110. In still another embodiment, the boot program 120 may be initially stored in the flash storage 110 during manufacture of the flash storage device 105.

Figure 2:
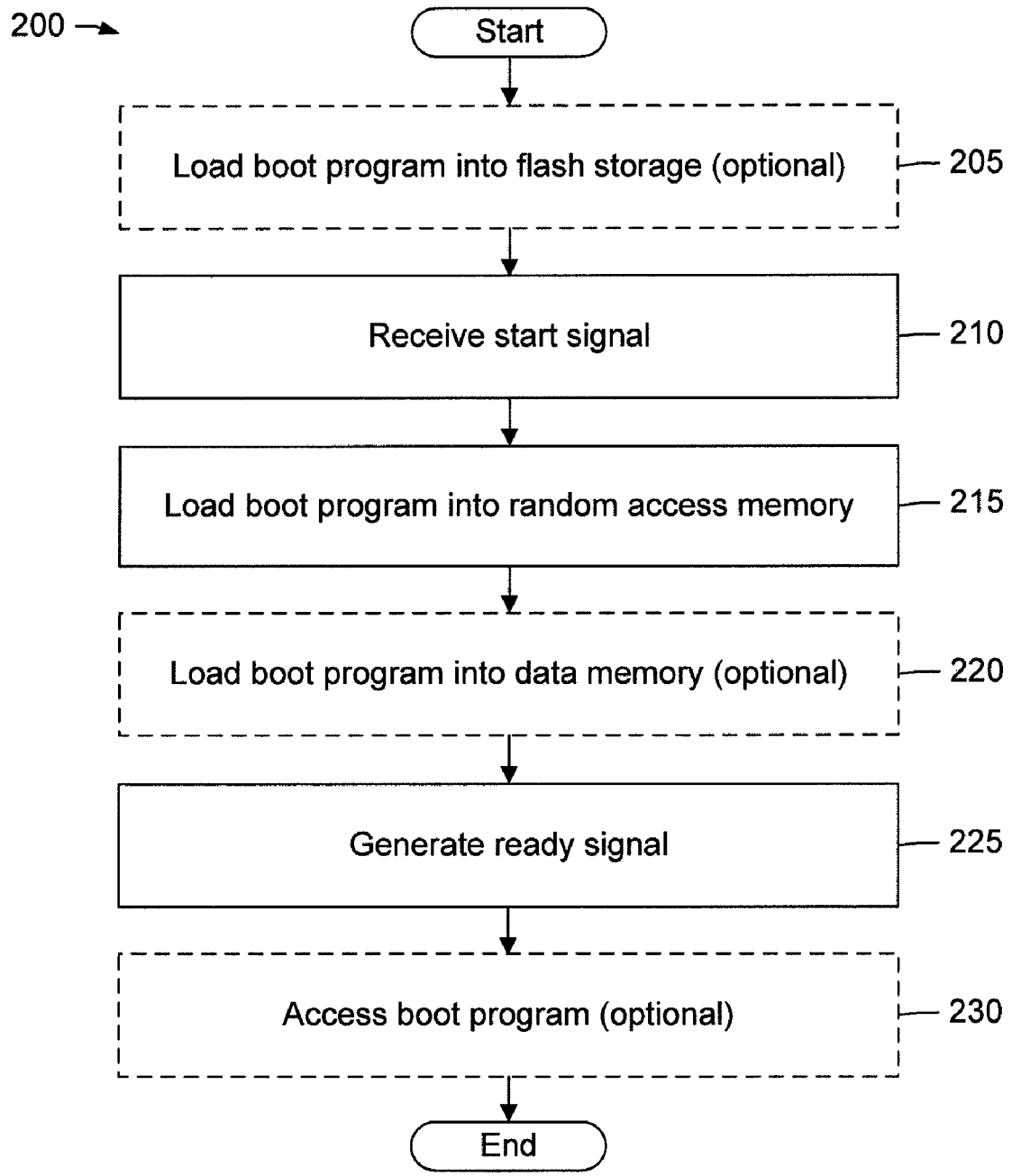
FIG. 2 is a flow chart of a method of accessing a boot program of a computing system, in accordance with an embodiment of the present invention.

FIG. 2 illustrates a method 200 of accessing the boot program 120, in accordance with an embodiment of the present invention. In optional step 205, the boot program 120 is loaded into the flash storage 110. In one embodiment, the boot program 120 is loaded into flash storage 110 during manufacture of the flash storage device 105, for example by using a programmer to program the flash storage 110. In another embodiment, the processor 155 provides the boot program 120 to the flash controller 125, and the flash controller 125 stores the boot program 120 into the flash storage 110. The method 200 then proceeds to step 210.

In step 210, the flash controller 125 receives a start signal. In some embodiments, the flash controller 125 generates the start signal on power-up of the flash storage device 105. In other embodiments, the flash controller 125 receives the start signal from the processor 155 or from another device external of the flash storage device 105. The method 200 then proceeds to step 215.

In step 215, the flash controller 125 loads the boot program 120 from the flash storage 110 into the random access memory 115 based on the start signal. In some embodiments, the flash controller 125 loads the boot program 120 from the flash storage 110 into the random access memory 115 in response to the start signal. The method 200 then proceeds to step 220.

In optional step 220, the flash controller 125 loads the boot program 120 from the random access memory 115 into the data memory 140. In some embodiments, the flash controller 125 provides a control signal to the bus interface 130, and the bus interface 130 performs a direct memory access in response to the control signal to transfer the boot program 120 from the random access memory 115 to the data memory 140. The method 200 then proceeds to step 225.

In step 225, the flash controller 125 generates a ready signal indicating that the boot program 120 is accessible by the processor 155. In various embodiments, the flash controller 125 provides the ready signal to the processor 155 directly, though the bus interface 130, or through the bus interface 135. In one embodiment, the flash controller 125 generates the ready signal indicating the boot program 120 is accessible from the random access memory 115. In another embodiment, the flash controller 125 generates the ready signal indicating the boot program 120 is accessible from the data memory 140. The method 200 then proceeds to step 230.

In optional step 230, the processor 155 accesses the boot program 120, based on the ready signal received from the flash controller 125. Further, the processor 155 executes the boot program 120 to initialize the computing system 100. In one embodiment, the processor 155 accesses the boot program 120 from the random access memory 115 in response to the ready signal received from the flash controller 125. In another embodiment, the processor 155 accesses the boot program from the data memory 140 in response to the ready signal received from the flash controller 125. The method 200 then ends.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A flash storage system for accessing a boot program for a computing system, the flash storage system comprising:
    a flash storage;
    a random access memory;
    a flash controller coupled to the flash storage and the random access memory, the flash controller configured to load the boot program from the flash storage into the random access memory;
    a first bus interface coupled in communication with the random access memory and the flash controller, wherein the first bus interface is configured to be coupled to a system bus of the computing system; and
    a second bus interface coupled in communication with the flash controller, wherein the second bus interface is configured to be coupled to a communication bus of the computing system.

2. The flash storage system of claim 1, wherein the flash controller is further configured to load the boot program from the flash storage into the random access memory in response to a start signal.

3. The flash storage system of claim 2 further configured to generate the start signal upon a power-on of the flash storage system.

4. The flash storage system of claim 1 further comprising an integrated circuit comprising the flash storage, the random access memory, and the flash controller.

5. The flash storage system of claim 1, wherein the flash controller is further configured to load the boot program from the flash storage into the random access memory by performing a direct memory access.

6. The flash storage system of claim 1 further configured to generate a ready signal indicating the boot program is accessible from the random access memory.

7. The flash storage system of claim 1, wherein the flash controller is further configured to load the boot program from the random access memory to a data memory external of the flash storage system and to generate a ready signal indicating the boot program is accessible from the data memory.

8. The flash storage system of claim 7, wherein the flash controller is further configured to load the boot program from the random access memory to the data memory by performing a direct memory access.

9. A computing system, comprising:
a processor coupled to a system bus and a communication bus;
a data memory coupled to the processor via the system bus; and
a flash storage device coupled to the processor, the flash storage device comprising
a flash storage;
a random access memory;
a flash controller coupled to the flash storage and the random access memory, the flash controller configured to load the boot program from the flash storage into the random access memory;
a first bus interface coupled in communication with the random access memory and the flash controller, wherein the first bus interface is configured to be coupled to the system bus; and
a second bus interface coupled in communication with the flash controller, wherein the second bus interface is configured to be coupled to the communication bus.

10. The computing system of claim 9, wherein the flash controller is further configured to load the boot program from the flash storage into the random access memory in response to a start signal.

11. The computing system of claim 9, wherein the flash storage device is further configured to generate the start signal upon a power-on of the flash storage system.

12. The computing system of claim 9, wherein the processor is further configured to generate the start signal upon a power-on of the computing system.

13. The computing system of claim 9 further comprising an integrated circuit comprising the flash storage, the random access memory, and the flash controller.

14. The computing system of claim 9, wherein the flash controller is further configured to load the boot program from the flash storage into the random access memory by performing a direct memory access.

15. The computing system of claim 9, wherein the flash controller is further configured to generate a ready signal indicating the boot program is accessible from the random access memory.

16. The computing system of claim 9, wherein the flash controller is further configured to load the boot program from the random access memory into the data memory.

17. The computing system of claim 16, wherein the processor is further configured to generate a ready signal indicating the boot program is accessible from the data memory.

18. A method of accessing a boot program in a computing system comprising a flash storage device, the method comprising:
receiving a start signal;
loading the boot program from a flash storage of the flash storage device to a random access memory of the flash storage device based on the start signal, wherein the boot program comprises a basic input-output system; and
generating a ready signal indicating the boot program is accessible in the random access memory.

19. The method of claim 18 further comprising loading the boot program into the flash storage.

20. The method of claim 18 further comprising loading the boot program into a data memory of the computing system.

* * * * *